(12) United States Patent
Krishnagi et al.

(10) Patent No.: US 12,411,921 B2
(45) Date of Patent: Sep. 9, 2025

(54) SYSTEM AND METHOD FOR DETECTING LOGIN FRAUD BASED ON A MACHINE LEARNING MODEL

(71) Applicant: JPMorgan Chase Bank, N.A., New York, NY (US)

(72) Inventors: Kumar Rao Krishnagi, Powell, OH (US); Rupa Shah, Morristown, NJ (US); Gaurav Chawla, Hoboken, NJ (US); Vaibhav Vaibhav, Bernardsville, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 216 days.

(21) Appl. No.: 18/140,934

(22) Filed: Apr. 28, 2023

(65) Prior Publication Data

US 2023/0385390 A1    Nov. 30, 2023

Related U.S. Application Data

(60) Provisional application No. 63/365,221, filed on May 24, 2022.

(51) Int. Cl.
  *G06F 21/31*    (2013.01)
  *G06F 21/32*    (2013.01)

(52) U.S. Cl.
  CPC ............ *G06F 21/32* (2013.01); *G06F 21/316* (2013.01)

(58) Field of Classification Search
  CPC ........ G06F 21/31; G06F 21/32; G06F 21/316; H04L 63/1408; H04L 63/1416; H04L 63/1425
  See application file for complete search history.

(56) References Cited

U.S. PATENT DOCUMENTS

| | | | |
|---|---|---|---|
| 11,641,368 B1* | 5/2023 | Shah | H04L 63/083 726/6 |
| 12,206,691 B2* | 1/2025 | Kaul | H04L 63/1425 |
| 2018/0069867 A1* | 3/2018 | Grajek | G06N 7/00 |
| 2019/0130168 A1* | 5/2019 | Khitrov | G06N 3/045 |
| 2019/0289025 A1 | 9/2019 | Kursun et al. | |

(Continued)

OTHER PUBLICATIONS

Official Communication Received in PCT Application No. PCT/US/2023/22520, dated Aug. 4, 2023.

*Primary Examiner* — Malcolm Cribbs
(74) *Attorney, Agent, or Firm* — GREENBLUM & BERNSTEIN, P.L.C.

(57) ABSTRACT

Various methods, apparatuses/systems, and media for detecting login fraud based on a machine learning model are disclosed. A processor creates a machine learning model configured to be trained to generate a score based on user's biometrics data and a pattern of activity logs data of the user; trains the machine learning model with the user biometrics data and the pattern of activity logs data in real-time; receives user credentials data from the user for login attempt into a system; compares the received user credentials data with the biometrics data and the pattern of activity logs data of the user stored on a database and the machine learning model; and generates the score, in response to comparing, by utilizing the trained machine learning model. The score is a value that the processor compares with a predetermined threshold value to determine in real-time whether the login attempt is fraudulent.

19 Claims, 7 Drawing Sheets

(56) References Cited

U.S. PATENT DOCUMENTS

| | | |
|---|---|---|
| 2020/0387602 A1 | 12/2020 | Kursun |
| 2021/0042581 A1 | 2/2021 | Kursun |
| 2021/0044578 A1* | 2/2021 | Chan ..................... H04L 63/04 |
| 2023/0089920 A1* | 3/2023 | Post .................... H04L 63/1416 726/5 |
| 2023/0273982 A1* | 8/2023 | Mavrommatis ....... G06F 21/316 726/7 |

* cited by examiner

| Feature | Description |
|---|---|
| Device Version Downgrade | the current login is Lower than any of the Operating System Versions recorded previously for that device |
| Device Age | set to the number of days its been since the device was first used to login |
| Login Count | loginCount_10_min, loginCount_1_days, loginCount_7_days, loginCount_10_days which is set to the number of logins in the time window for that person |
| Shared Devices | the number of person IDs for each device ID |
| Time Between Logins | the number of days between each login by that person ID |

FIG. 6

SYSTEM AND METHOD FOR DETECTING LOGIN FRAUD BASED ON A MACHINE LEARNING MODEL

CROSS-REFERENCE TO RELATED APPLICATIONS

This application claims the benefit of priority from U.S. Provisional Patent Application No. 63/365,221, filed May 24, 2022, which is herein incorporated by reference in its entirety.

TECHNICAL FIELD

This disclosure generally relates to user login authentication, and, more particularly, to methods and apparatuses for implementing a platform and language agnostic machine learning/artificial intelligence module configured to detect login fraud based on a machine learning model.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Conventional authentication systems often face difficulties in combating increasingly sophisticated fraud techniques. Perpetrators of fraud strive to find the point of least resistance and continue to access the system through that point. Often, login for exemplary use case of transactions may be authenticated based on multiple customer authentication factors. Typically, these factors may include, but not limited thereto: (1) something a user knows; (2) something the user is; and (3) something the user has. With respect to the first factor, something the user knows may include such things as a username, password, and security questions. These factors can be easily compromised and are increasingly at risk for being used to perpetrate fraud. Fraudulent actors have an increasing number of information sources available such as email accounts and social media accounts, from which to acquire personal information. What the user "knows" has historically been one of the weakest security measures against fraud. With regard to the second category of factors, what the user "is" may take the form of an IP address or caller ID. However, even with this second category of authentication factor, computers and mobile phones are frequently targets of theft and can be accessed and used by fraudulent actors. With the third category of information, things that the user has may include RSID tokens or payment cards. These identifiers can also be easily stolen. Biometric indicators such as fingerprints, facial ID, and retinal prints also fall into this category and may generally be more reliable indicators but are not currently frequently used.

For example, existing financial processing systems often rely on one or two of the above-identified easy-to-compromise methods to authenticate login. Even two-step authentication methods that rely upon dynamic token passwords have been more frequently compromised. Detection of fraudulent transactions due to unlawful login has also been a challenge because data used for authentication may change over time. Customers may forget passwords, lose credit cards, or change phones, for example. The failure of one or more authentication attempts is not necessarily, in itself, an indication of fraud.

A fourth category of information may include "something a user does". This may relate to a pattern of activity logs. For example, certain users may frequently use an ATM machine, make purchases online, dine at a specific restaurant, or frequently login from a specific location outside his/her normal location, etc. The users may perform these actions on particular dates, weeks, or months, at fairly regular times.

Conventional authentication systems do not utilize this pattern of activity logs of the user for authentication purposes. Thus, the security policies of authentication systems typically do not take into consideration activities and historical actions of a user across all channels and applications. Historical actions can be indicative of valid future actions as well as of fraudulent future actions. Additionally, levels of risks may be associated not only with actions, but also with particular a user. Conventional systems often fail to take this fact into account during authentication processing.

Therefore, there is a need for an advanced tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a platform and language agnostic machine learning/artificial intelligence module configured to detect login fraud based on a machine learning model that generates a weighted score of login confidence data, but the disclosure is not limited thereto. For example, the present disclosure, through one or more of its various aspects, embodiments, and/or specific features or sub-components, provides, among other features, various systems, servers, devices, methods, media, programs, and platforms for implementing a platform and language agnostic machine learning/artificial intelligence module configured to train the machine learning model with a pattern of activity logs of a user corresponding to past activities data and historical actions data of a user across all channels and applications login; and historical weighted score (i.e., a value between 1 through 100) of the login confidence data associated with the user.

According to exemplary embodiments, a method for detecting login fraud based on a machine learning model by utilizing one or more processors along with allocated memory is disclosed. The method may include: accessing a database that stores user biometrics data and a pattern of activity logs data of the user utilized for past authentication purposes for logging into a plurality of systems; creating a machine learning model configured to be trained to generate a score based on the user biometrics data and a pattern of activity logs data; training the machine learning model with the user biometrics data and the pattern of activity logs data in real-time (i.e., within 10 milliseconds to about 100 milliseconds of receiving the user biometrics data and the pattern of activity logs data); receiving user credentials data from the user for login attempt into a system among the plurality of systems; comparing the received user credentials data with the biometrics data and the pattern of activity logs data of the user stored on the database and the machine learning model; and generating the score, in response to comparing, by utilizing the trained machine learning model, wherein the score is a value that is compared with a predetermined threshold value to determine in real-time (i.e., within 10 milliseconds to about 100 milliseconds of receiving user credentials data) whether the login attempt is fraudulent.

According to exemplary embodiments, the pattern of activity logs data may include one or more of the following data: data corresponding to the user's frequent use of an automated teller machine, data corresponding to the user's historical online purchase, data corresponding to the user's dining at a specific restaurant, data corresponding to the user's frequent login from a specific geo location outside the user's normal location, and data corresponding to the user's logins on particular dates, weeks, or months, at regular times, but the disclosure is not limited thereto.

According to exemplary embodiments, biometrics data may include one or more of the following data: data corresponding to the user's fingerprints, data corresponding to the user's facial identification, and data corresponding to the user's retinal prints, but the disclosure is not limited thereto.

According to exemplary embodiments, the method may further include: determining, in response to comparing the user credentials data with the biometrics data and the pattern of activity logs data of the user, that the generated score is below the predetermined threshold value; detecting that the user's login attempt is fraudulent; denying the user to access the system; and retraining the machine learning model with data associated with denying the user to access the system.

According to exemplary embodiments, the method may further include: transmitting an electronic notification to a user's computing device associated with the user's previous successful login indicating that a location or a computing device the user is currently utilizing to attempt login does not match with the prestored pattern of actively logs data of the user.

According to exemplary embodiments, the method may further include: receiving user's input data from the user's computing device associated with the user's previous successful login indicating that the location or the computing device the user is currently utilizing to attempt login is actually correct; allowing the user to access the system based on receiving the user's input data; and retraining the machine learning model with data associated with allowing the user to access the system.

According to exemplary embodiments, the method may further include: receiving user's input data from the user's computing device associated with the user's previous successful login indicating that the location or the computing device the user who is currently utilizing to attempt login is not correct; denying the user who is currently utilizing to attempt login to access the system based on receiving the user's input data; and retraining the machine learning model with data associated with denying the user to access the system.

According to exemplary embodiments, the method may further include: determining, in response to comparing the user credentials data with the biometrics data and the pattern of activity logs data of the user, that the generated score is equal to or above the predetermined threshold value; and detecting that the user's login attempt is not fraudulent; allowing the user to access the system; and retraining the machine learning model with data associated with allowing the user to access the system.

According to exemplary embodiments, the score may be a weighted value related to a degree of confidence data that indicates readiness for authorizing login authentication of the user.

According to exemplary embodiments, a system for implementing for detecting login fraud based on a machine learning model is disclosed. The system may include: a processor; and a memory operatively connected to the processor via a communication interface, the memory storing computer readable instructions, when executed, may cause the processor to: access a database that stores user biometrics data and a pattern of activity logs data of the user utilized for past authentication purposes for logging into a plurality of systems; create a machine learning model configured to be trained to generate a score based on the user biometrics data and a pattern of activity logs data; train the machine learning model with the user biometrics data and the pattern of activity logs data in real-time; receive user credentials data from the user for login attempt into a system among the plurality of systems; compare the received user credentials data with the biometrics data and the pattern of activity logs data of the user stored on the database and the machine learning model; and generate the score, in response to comparing, by utilizing the trained machine learning model, wherein the score is a value that is compared with a predetermined threshold value to determine in real-time whether the login attempt is fraudulent.

According to exemplary embodiments, the processor may be further configured to: determine, in response to comparing the user credentials data with the biometrics data and the pattern of activity logs data of the user, that the generated score is below the predetermined threshold value; detect that the user's login attempt is fraudulent; denying the user to access the system; and retrain the machine learning model with data associated with denying the user to access the system.

According to exemplary embodiments, the processor may be further configured to: transmit an electronic notification to a user's computing device associated with the user's previous successful login indicating that a location or a computing device the user is currently utilizing to attempt login does not match with the prestored pattern of actively logs data of the user.

According to exemplary embodiments, the processor may be further configured to: receive user's input data from the user's computing device associated with the user's previous successful login indicating that the location or the computing device the user is currently utilizing to attempt login is actually correct; allow the user to access the system based on receiving the user's input data; and retrain the machine learning model with data associated with allowing the user to access the system.

According to exemplary embodiments, the processor may be further configured to: receive user's input data from the user's computing device associated with the user's previous successful login indicating that the location or the computing device the user who is currently utilizing to attempt login is not correct; deny the user who is currently utilizing to attempt login to access the system based on receiving the user's input data; and retrain the machine learning model with data associated with denying the user to access the system.

According to exemplary embodiments, the processor may be further configured to: determine, in response to comparing the user credentials data with the biometrics data and the pattern of activity logs data of the user, that the generated score is equal to or above the predetermined threshold value; and detect that the user's login attempt is not fraudulent; allow the user to access the system; and retraining the machine learning model with data associated with allowing the user to access the system.

According to exemplary embodiments, a non-transitory computer readable medium configured to store instructions for detecting login fraud based on a machine learning model is disclosed. The instructions, when executed, may cause a processor to perform the following: accessing a database that stores user biometrics data and a pattern of activity logs data of the user utilized for past authentication purposes for logging into a plurality of systems; creating a machine learning model configured to be trained to generate a score based on the user biometrics data and a pattern of activity logs data; training the machine learning model with the user biometrics data and the pattern of activity logs data in real-time; receiving user credentials data from the user for login attempt into a system among the plurality of systems; comparing the received user credentials data with the biometrics data and the pattern of activity logs data of the user stored on the database and the machine learning model; and generating the score, in response to comparing, by utilizing the trained machine learning model, wherein the score is a value that is compared with a predetermined threshold value to determine in real-time whether the login attempt is fraudulent. According to exemplary embodiments, the method may further include: determining, in response to comparing the user credentials data with the biometrics data and the pattern of activity logs data of the user, that the generated score is below the predetermined threshold value; detecting that the user's login attempt is fraudulent; denying the user to access the system; and retraining the machine learning model with data associated with denying the user to access the system.

According to exemplary embodiments, the instructions, when executed, may cause the processor to perform the following: transmitting an electronic notification to a user's computing device associated with the user's previous successful login indicating that a location or a computing device the user is currently utilizing to attempt login does not match with the prestored pattern of actively logs data of the user.

According to exemplary embodiments, the instructions, when executed, may cause the processor to perform the following: receiving user's input data from the user's computing device associated with the user's previous successful login indicating that the location or the computing device the user is currently utilizing to attempt login is actually correct; allowing the user to access the system based on receiving the user's input data; and retraining the machine learning model with data associated with allowing the user to access the system.

According to exemplary embodiments, the instructions, when executed, may cause the processor to perform the following: receiving user's input data from the user's computing device associated with the user's previous successful login indicating that the location or the computing device the user who is currently utilizing to attempt login is not correct; denying the user who is currently utilizing to attempt login to access the system based on receiving the user's input data; and retraining the machine learning model with data associated with denying the user to access the system.

According to exemplary embodiments, the instructions, when executed, may cause the processor to perform the following: determining, in response to comparing the user credentials data with the biometrics data and the pattern of activity logs data of the user, that the generated score is equal to or above the predetermined threshold value; and detecting that the user's login attempt is not fraudulent; allowing the user to access the system; and retraining the machine learning model with data associated with allowing the user to access the system.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 6 illustrates an exemplary table implemented by the platform and language agnostic machine learning login fraud detection module of FIG. 4 that illustrates exemplary features and corresponding descriptions that are being utilized to determine authenticity of a user in real-time in accordance with an exemplary embodiment.

DETAILED DESCRIPTION

Figure 1:
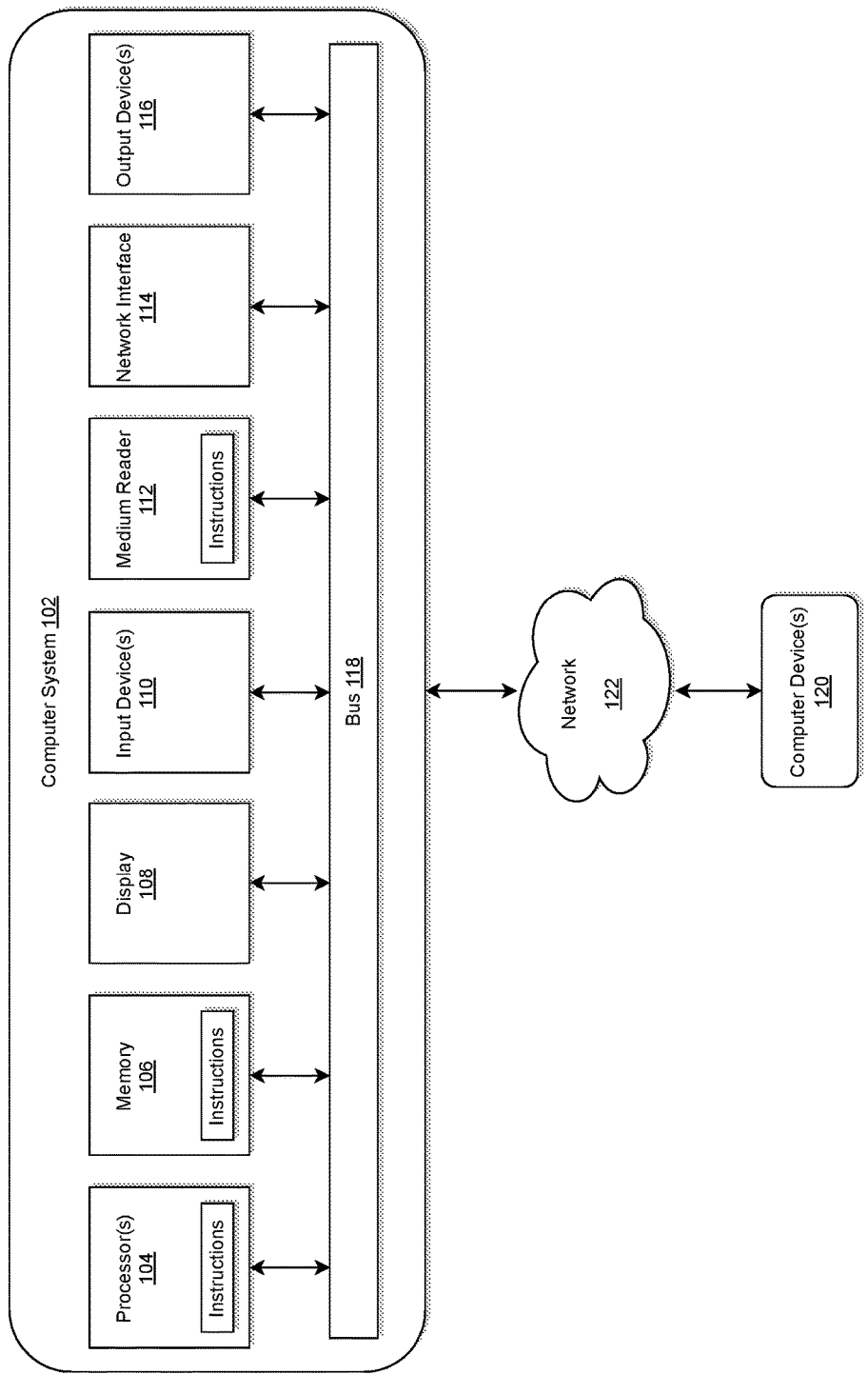
FIG. 1 illustrates a computer system for implementing a platform and language agnostic machine learning login fraud detection module configured to automatically detect login fraud based on a machine learning model in real-time in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for implementing a platform and language agnostic machine learning login fraud detection module for automatically detecting login fraud based on a machine learning model in real-time in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

The configuration/data files, according to exemplary embodiments, may be written using JSON (Java Script Object Notation), but the disclosure is not limited thereto. For example, the configuration/data files can easily be extended to other readable file formats such as XML, YAML, etc., or any other configuration-based languages.

Figure 2:
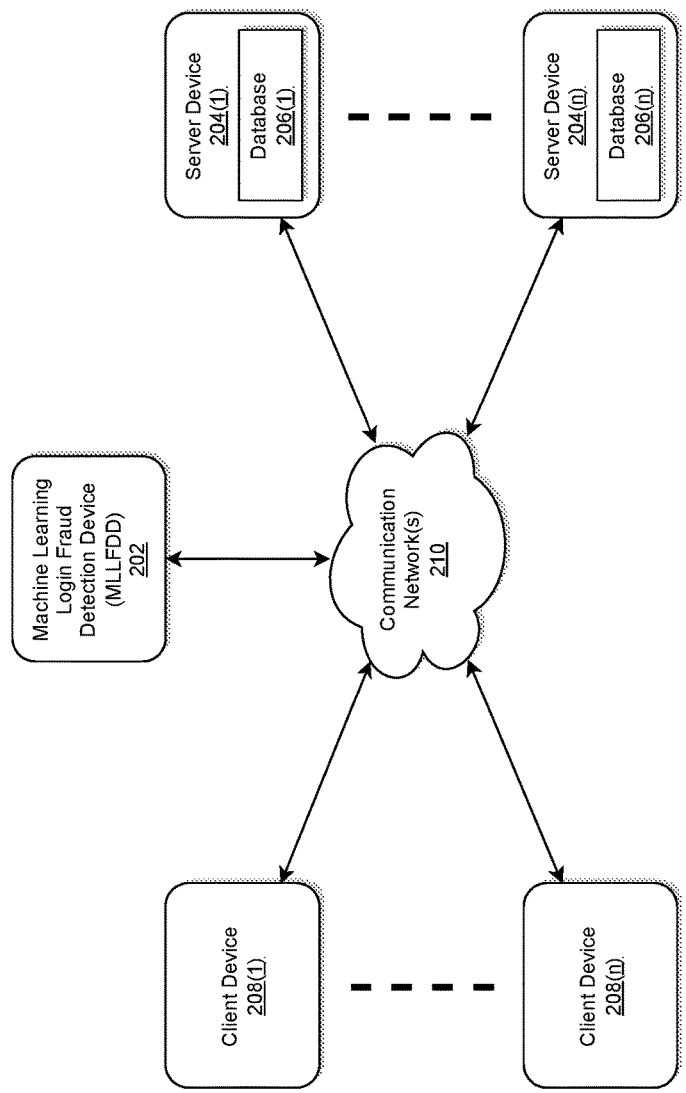
FIG. 2 illustrates an exemplary diagram of a network environment with a platform and language agnostic machine learning login fraud detection device in accordance with an exemplary embodiment.

Referring to FIG. 2, a schematic of an exemplary network environment 200 for implementing a platform and language agnostic machine learning login fraud detection device (MLLFDD) to automatically detect login fraud based on a machine learning model in real-time that generates a weighted score of login confidence data of the instant disclosure is illustrated.

According to exemplary embodiments, the above-described problems associated with conventional approach of detecting login fraud may be overcome by implementing an MLLFDD 202 as illustrated in FIG. 2 that may implement a platform and language agnostic machine learning login fraud detection module for automatically detecting login fraud based on a machine learning model in real-time that generates a weighted score of login confidence data, but the disclosure is not limited thereto.

For example, conventional authentication systems do not utilize pattern of activity logs of the user for authentication purposes. Thus, the security policies of authentication systems typically do not take into consideration activities and historical actions of a user across all channels and applications. Historical actions can be indicative of valid future actions as well as of fraudulent future actions. Additionally, levels of risks may be associated not only with actions, but also with particular a user. Conventional systems often fail to take this fact into account during authentication processing.

By implementing the MLLFDD 202 as illustrated in FIG. 2 that may implement a platform and language agnostic machine learning/artificial intelligence module configured to train the machine learning model with a pattern of activity logs of a user corresponding to past activities data and historical actions data of a user across all channels and applications login; and historical weighted score of the login confidence data associated with the user in real-time, but the disclosure is not limited thereto. Thus, conventional shortcomings of authentication systems can be improved by the implementation of the MLLFDD 202.

The MLLFDD 202 may be the same or similar to the computer system 102 as described with respect to FIG. 1.

The MLLFDD 202 may store one or more applications that can include executable instructions that, when executed by the MLLFDD 202, cause the MLLFDD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MLLFDD 202 itself, may be located in virtual server(s) running in a cloud-based computing environment rather than being tied to one or more specific physical network computing devices. Also, the application(s) may be running in one or more virtual machines (VMs) executing on the MLLFDD 202. Additionally, in one or more embodiments of this technology, virtual machine(s) running on the MLLFDD 202 may be managed or supervised by a hypervisor.

In the network environment 200 of FIG. 2, the MLLFDD 202 is coupled to a plurality of server devices 204(1)-204(n) that hosts a plurality of databases 206(1)-206(n), and also to a plurality of client devices 208(1)-208(n) via communication network(s) 210. A communication interface of the MLLFDD 202, such as the network interface 114 of the computer system 102 of FIG. 1, operatively couples and communicates between the MLLFDD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MLLFDD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MLLFDD 202 may be a standalone device or integrated with one or more other devices or apparatuses, such as one or more of the server devices 204(1)-204(n), for example. In one particular example, the MLLFDD 202 may be hosted by one of the server devices 204(1)-204(n), and other arrangements are also possible. Moreover, one or more of the devices of the MLLFDD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MLLFDD 202 via the communication network(s) 210 according to the HTTP-based and/or JSON protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the MLLFDD 202 that may efficiently provide a platform for implementing a platform and a language agnostic machine learning login fraud detection module for automatically detecting login fraud based on a machine learning model in real-time that generates a weighted score of login confidence data, but the disclosure is not limited thereto. According to exemplary embodiments, the client devices 208(1)-208(n) in this example may include any type of computing device that can facilitate the implementation of the MLLFDD 202 that may efficiently provide a platform for implementing a platform and a language agnostic machine learning/artificial intelligence login fraud detection module configured to train the machine learning model with a pattern of activity logs of a user corresponding to past activities data and historical actions data of a user across all channels and applications login; and historical weighted score of the login confidence data associated with the user in real-time, but the disclosure is not limited thereto, but the disclosure is not limited thereto.

The client devices 208(1)-208(n) may run interface applications, such as standard web browsers or standalone client applications, which may provide an interface to communicate with the MLLFDD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the MLLFDD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MLLFDD 202, the server devices 204(1)-204(n), or the client devices 208(1)-208(n), for example, may be configured to operate as virtual instances on the same physical machine. For example, one or more of the MLLFDD 202, the server devices 204(1)-204(n), or the client devices 208(1)-208(n) may operate on the same physical device rather than as separate devices communicating through communication network(s) 210. Additionally, there may be more or fewer MLLFDDs 202, server devices 204(1)-204(n), or client devices 208(1)-208(n) than illustrated in FIG. 2. According to exemplary embodiments, the MLLFDD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
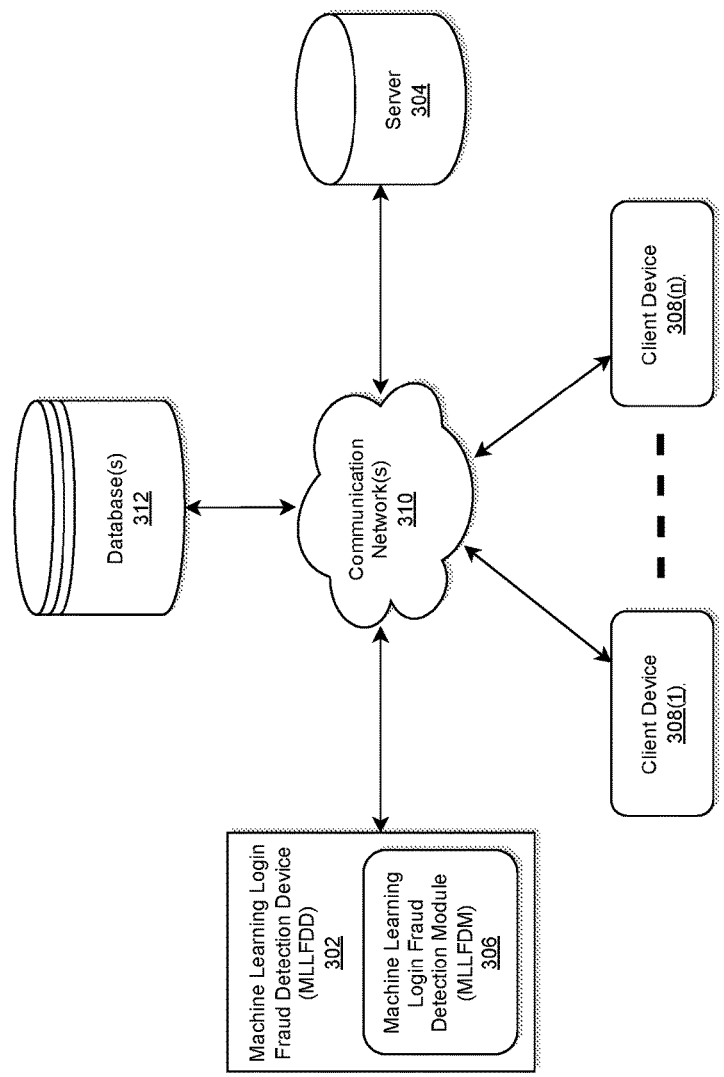
FIG. 3 illustrates a system diagram for implementing a platform and language agnostic machine learning login fraud detection device having a platform and language agnostic machine learning login fraud detection module in accordance with an exemplary embodiment.

FIG. 3 illustrates a system diagram for implementing a platform and language agnostic MLLFDD having a platform and language agnostic machine learning login fraud detection module (MLLFDM) in accordance with an exemplary embodiment.

As illustrated in FIG. 3, the system 300 may include an MLLFDD 302 within which an MLLFDM 306 is embedded, a server 304, a database(s) 312, a plurality of client devices 308(1) . . . 308(n), and a communication network 310.

According to exemplary embodiments, the MLLFDD 302 including the MLLFDM 306 may be connected to the server 304, and the database(s) 312 via the communication network 310. The MLLFDD 302 may also be connected to the plurality of client devices 308(1) . . . 308(n) via the communication network 310, but the disclosure is not limited thereto.

According to exemplary embodiment, the MLLFDD 302 is described and shown in FIG. 3 as including the MLLFDM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a private or public cloud databases (i.e., AWS, S3, etc.), a log database (i.e., Splunk) that may that may produce programming for searching, monitoring, and analyzing machine-generated data via a Web-style interface, etc., but the disclosure is not limited thereto.

According to exemplary embodiments, the MLLFDM 306 may be configured to receive real-time feed of data from the plurality of client devices 308(1) . . . 308(n) via the communication network 310.

As will be described below, the MLLFDM 306 may be configured to access a database that stores user biometrics data and a pattern of activity logs data of the user utilized for past authentication purposes for logging into a plurality of systems; create a machine learning model configured to be trained to generate a score based on the user biometrics data and a pattern of activity logs data; train the machine learning model with the user biometrics data and the pattern of activity logs data in real-time; receive user credentials data from the user for login attempt into a system among the plurality of systems; compare the received user credentials data with the biometrics data and the pattern of activity logs data of the user stored on the database and the machine learning model; and generate the score, in response to comparing, by utilizing the trained machine learning model, wherein the score is a value that is compared with a predetermined threshold value to determine in real-time whether the login attempt is fraudulent, but the disclosure is not limited thereto.

The plurality of client devices 308(1) . . . 308(n) are illustrated as being in communication with the MLLFDD 302. In this regard, the plurality of client devices 308(1) . . . 308(n) may be "clients" of the MLLFDD 302 and are described herein as such. Nevertheless, it is to be known and understood that the plurality of client devices 308(1) . . . 308(n) need not necessarily be "clients" of the MLLFDD 302, or any entity described in association therewith herein. Any additional or alternative relationship may exist between either or both of the plurality of client devices 308(1) . . . 308(n) and the MLLFDD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the MLLFDD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The MLLFDD 302 may be the same or similar to the MLLFDD 202 as described with respect to FIG. 2, including any features or combination of features described with respect thereto.

Figure 4:
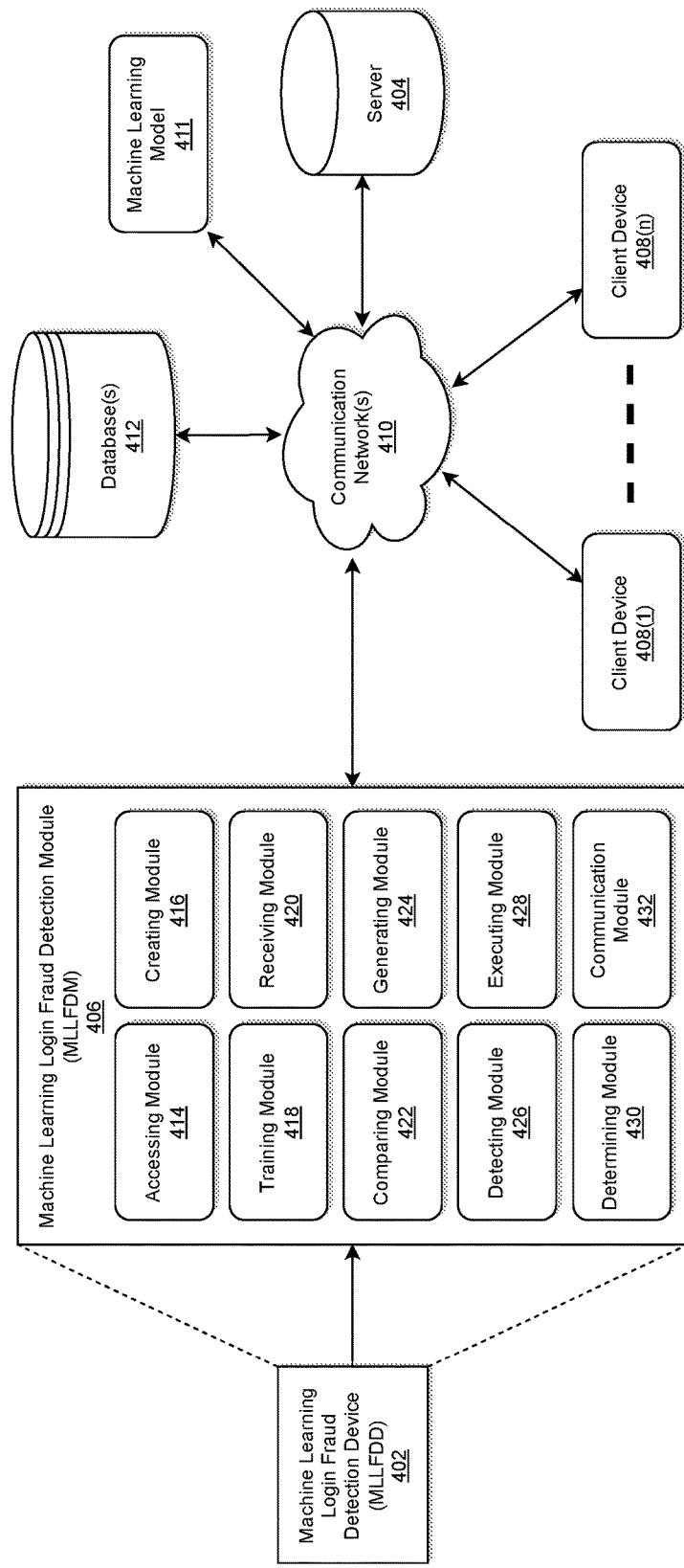
FIG. 4 illustrates a system diagram for implementing a platform and language agnostic machine learning login fraud detection module of FIG. 3 in accordance with an exemplary embodiment.

FIG. 4 illustrates a system diagram for implementing a platform and language agnostic MLLFDM of FIG. 3 in accordance with an exemplary embodiment.

According to exemplary embodiments, the system 400 may include a platform and language agnostic MLLFDD 402 within which an MLLFDM 406 is embedded, a server 404, database(s) 412 (i.e., database(s) 412 may be provided within one or more datacenters), a machine learning model 411, and a communication network 410.

According to exemplary embodiments, the MLLFDD 402 including the MLLFDM 406 may be connected to the server 404, the machine learning model 411, and the database(s) 412 via the communication network 410. The MLLFDD 402 may also be connected to the plurality of client devices 408(1)-408(n) via the communication network 410, but the disclosure is not limited thereto. The MLLFDM 406, the server 404, the plurality of client devices 408(1)-408(n), the database(s) 412, the communication network 410 as illustrated in FIG. 4 may be the same or similar to the MLLFDM 306, the server 304, the plurality of client devices 308(1)-308(n), the database(s) 312, the communication network 310, respectively, as illustrated in FIG. 3.

According to exemplary embodiments, as illustrated in FIG. 4, the MLLFDM 406 may include an accessing module 414, a creating module 416, a training module 418, a receiving module 420, a comparing module 422, a generating module 424, a detecting module 426, an executing module 428, a determining module 430, and a communication module 432.

According to exemplary embodiments, each of the accessing module 414, creating module 416, training module 418, receiving module 420, comparing module 422, generating module 424, detecting module 426, executing module 428, determining module 430, and the communication module 432 of the MLLFDM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the accessing module 414, creating module 416, training module 418, receiving module 420, comparing module 422, generating module 424, detecting module 426, executing module 428, determining module 430, and the communication module 432 of the MLLFDM 406 may be implemented by microprocessors or similar, and may be programmed using software (e.g., microcode) to perform various functions discussed herein and may optionally be driven by firmware and/or software.

Alternatively, according to exemplary embodiments, each of the accessing module 414, creating module 416, training module 418, receiving module 420, comparing module 422, generating module 424, detecting module 426, executing module 428, determining module 430, and the communication module 432 of the MLLFDM 406 may be implemented by dedicated hardware, or as a combination of dedicated hardware to perform some functions and a processor (e.g., one or more programmed microprocessors and associated circuitry) to perform other functions.

According to exemplary embodiments, each of the accessing module 414, creating module 416, training module 418, receiving module 420, comparing module 422, generating module 424, detecting module 426, executing module 428, determining module 430, and the communication module 432 of the MLLFDM 406 may be called via corresponding API.

The process may be executed via the communication module 432 and the communication network 410, which may comprise plural networks as described above. For example, in an exemplary embodiment, the various components of the MLLFDM 406 may communicate with the server 404, and the database(s) 412 via the communication module 432 and the communication network 410. Of course, these embodiments are merely exemplary and are not limiting or exhaustive.

According to exemplary embodiments, the communication network 410 and the communication module 432 may be configured to establish a link between the database(s) 412, the client devices 408(1)-408(n) and the MLLFDM 406.

According to exemplary embodiments, the accessing module 414 may be configured to access the database(s) 412 that stores user biometrics data and a pattern of activity logs data of the user utilized for past authentication purposes for logging into a plurality of systems.

According to exemplary embodiments, the accessing module 414 may be configured to access the datacenters that include the database(s) 412. The creating module 416 may be configured to create the machine learning model 411 configured to be trained to generate a score based on the user biometrics data and a pattern of activity logs data. The training module 418 may be configured to train the machine learning model 411 with the user biometrics data and the pattern of activity logs data in real-time. The receiving module 420 may be configured to receive user credentials data from the user for login attempt into a system among the plurality of systems (i.e., the plurality of systems may include the client device 408(1) . . . 408(n)). The comparing module 422 may be configured to compare the received user credentials data with the biometrics data and the pattern of activity logs data of the user stored on the database and the machine learning model 411. The generating module 424 may be configured to generate the score, in response to comparing, by utilizing the trained machine learning model 411, wherein the score is a value that is compared with a predetermined threshold value to determine in real-time whether the login attempt is fraudulent.

According to exemplary embodiments, the pattern of activity logs data may include one or more of the following data: data corresponding to the user's frequent use of an automated teller machine, data corresponding to the user's historical online purchase, data corresponding to the user's dining at a specific restaurant, data corresponding to the user's frequent login from a specific geo location outside the user's normal location, and data corresponding to the user's logins on particular dates, weeks, or months, at regular times, but the disclosure is not limited thereto.

For example, FIG. 6 illustrates an exemplary table 600 implemented by the platform and language agnostic MLLFDM 406 of FIG. 4 that illustrates exemplary features and corresponding descriptions that are being utilized to determine authenticity of a user in real-time who is trying to login in accordance with an exemplary embodiment. According to exemplary embodiments, exemplary features may include, but not limited there to, device version downgrade, device age, login count, shared devices, and time between logins.

According to exemplary embodiments, the description for "device version downgrade" may include "the current login is lower than any of the operating system versions recorded previously for that device." For example, the user is logging in from his/her mobile phone. The operating system of the mobile phone may be version 8, whereas historical record shows that the user previously consistently logged in using an operating system of version 10. This triggers an alert that the user may not be an authentic user and login is blocked because, it is known that a person does not downgrade an operating system, rather upgrades it.

According to exemplary embodiments, the description for "device age" may include "set to the number of days it has been since the device was first used to login." For example, it has been recorded that a user may be utilizing various devices, i.e., mobile phone, laptop, iPad, etc., for login. For example, when a user utilizes a mobile phone now to login, the MLLFDM 406 determines when was the same mobile phone first used by the user to login. This will determine the age of the device. If the MLLFDM 406 determines that the device age does not correspond to a predetermined value, this triggers an alert that the user may not be an authentic user and login is blocked.

According to exemplary embodiments, the description for "login count" may include "loginCount_10_min, loginCount_1_day, loginCount_7_days, loginCount_10_days which is set to the number of logins in the time window for that person." For example, for "loginCount_10_min", if a user logs in now, the MLLFDM 406 determines whether this is his/her first login or $7^{th}$ login since the last ten minutes. Similar count is tracked for loginCount_1_day, loginCount_7_days, loginCount_10_days. The MLLFDM 406 determines that the user previously did not log in very frequently, but suddenly crammed so many logins within a given window of time, i.e., logged in 12 times within 10 minutes. This triggers an alert that the user may not be an authentic user and login is blocked.

According to exemplary embodiments, the description for "shared devices" may include "the number of person IDs for each device ID." For example, a person in the same household as the user may utilize the same device. Thus, a record is being kept by the MLLFDM 406 as to how many household members are linked with the same device for log in to their respective accounts. If the MLLFDM 406 determines that the user is currently trying to login using an ID that is not linked with the household members, this triggers an alert that the user may not be an authentic user and login is blocked.

According to exemplary embodiments, the description for "time between logins" may include "the number of days between each login by that person ID." For example, if a user logs in now, the MLLFDM 406 determines how much time has elapsed since the last login by the same user. This is different than the login counts described earlier. Those login counts are based on predetermined time windows, i.e., how many times a user logged in within a given window. However, the "time between logins" describes how much time has elapsed since the last login by the same user. If the MLLFDM 406 determines that the time between logins does not correspond to a predetermined value, this triggers an alert that the user may not be an authentic user and login is blocked.

According to exemplary embodiments, biometrics data may include one or more of the following data: data corresponding to the user's fingerprints, data corresponding to the user's facial identification, and data corresponding to the user's retinal prints, but the disclosure is not limited thereto.

According to exemplary embodiments, the determining module 430 may be configured to determine, in response to comparing the user credentials data with the biometrics data and the pattern of activity logs data of the user, that the generated score is below the predetermined threshold value. The detecting module 426 may be configured to detect that the user's login attempt is fraudulent; and the executing module 428 may be configured to deny the user to access the system. The training module 418 may be configured to retrain the machine learning model 411 with data associated with denying the user to access the system.

Figure 7:
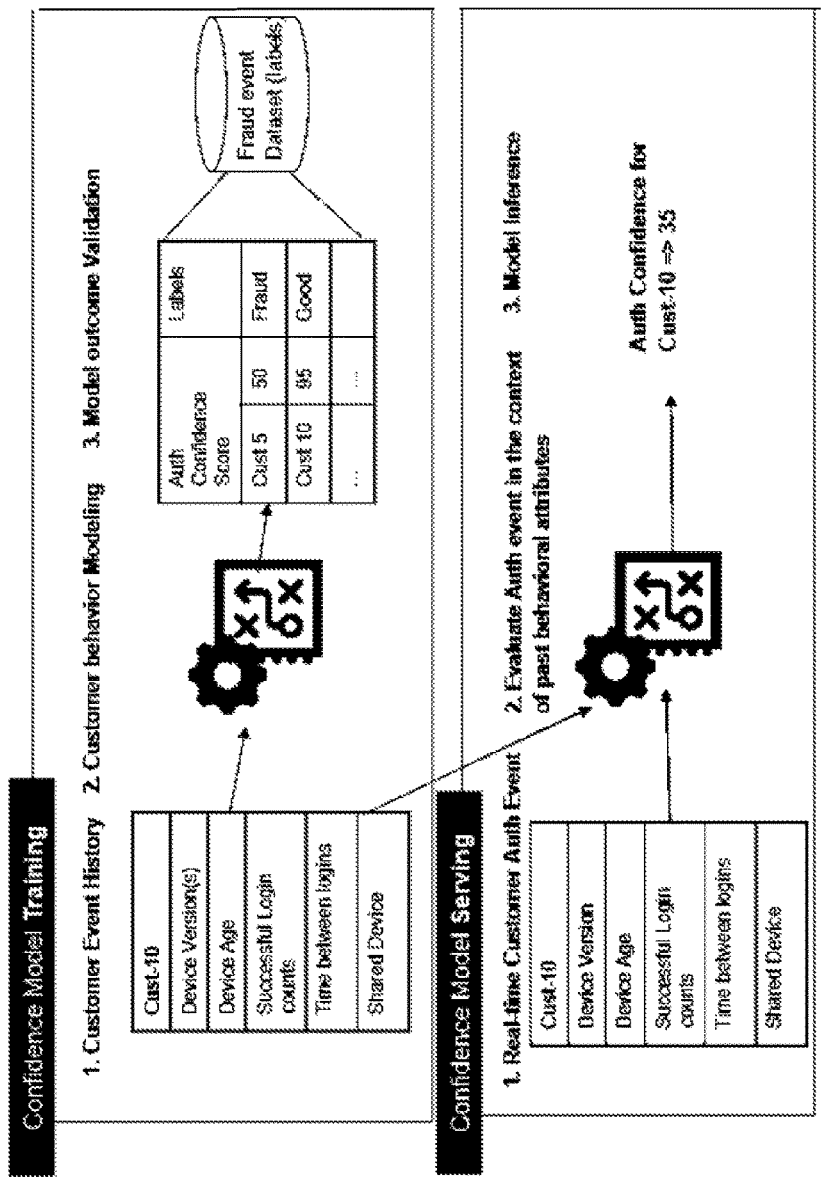
FIG. 7 illustrates an exemplary process of confidence model training and confidence model serving as implemented by the platform and language agnostic machine learning login fraud detection module of FIG. 4 in accordance with an exemplary embodiment.

For example, FIG. 7 illustrates an exemplary process 700 of confidence model training and confidence model serving as implemented by the platform and language agnostic MLLFDM 406 of FIG. 4 that utilizes the table 600 in accordance with an exemplary embodiment.

As illustrated in FIG. 7, the process 700 may first include confidence model training which may include the following: customer event history; customer behavior modeling; and model outcome validation. The model training dataset may include login and profile change events data for three months, i.e., about 3.64 billion sessions, but the disclosure is not limited thereto. According to exemplary embodiments, the following models may be trained, but the disclosure is not limited thereto: i) Deep learning Encoder—that creates embeddings that capture relationships between various sessions, followed by an anomaly detection algorithm; and ii) Random Forest that uses fraud labels from known cases. The quality of model inference may be measured using fraud data that includes customer history of login and profile change events. As illustrated in FIG. 7 under the confidence model training section, customer 5 received an authentication confidence score of 50 which is labeled as "fraud." Whereas customer 10 received an authentication confidence score of 95 which is labeled as "good." Thus, customer 5 was blocked by the MLLFDM 406 for login and customer 10 was allowed by the MLLFDM 406 to login.

As illustrated in FIG. 7, the process 700 may then include confidence model serving which may include the following: real-time customer authentication event; evaluate authentication event in the context of past behavioral attributes; and model inference. According to exemplary embodiments, in confidence model serving, the MLLFDM 406 may implement the following processes, but the disclosure is not limited thereto: i) customer login event with additional attributes is sent to the model; ii) the model evaluates the attributes based on historical behavioral attributes; and due to recent change in profile attributes and real-time behavioral attributes, model confidence score is lower than in the past, i.e., authentication confidence score for customer 10 is "35" which is lower than previously recorded, i.e., "95". Thus, this time customer 10 will be denied access to login.

According to exemplary embodiments, the communication module 432 may be configured to transmit an electronic notification to a user's computing device (i.e., any one of the client devices 408(1) . . . 408(n)) associated with the user's previous successful login indicating that a location or a computing device the user is currently utilizing to attempt login does not match with the prestored pattern of actively logs data of the user.

According to exemplary embodiments, receiving module 420 may be configured to receive user's input data from the user's computing device (i.e., any one of the client devices 408(1) . . . 408(n)) associated with the user's previous successful login indicating that the location or the computing device the user is currently utilizing to attempt login is actually correct. Accordingly, the executing module 428 may be configured to allowing the user to access the system based on receiving the user's input data; and the training module 418 may be configured to further retrain the machine learning model 411 with data associated with allowing the user to access the system.

According to exemplary embodiments, the receiving module 420 may be configured to receive user's input data from the user's computing device (i.e., any one of the client devices 408(1) . . . 408(n)) associated with the user's previous successful login indicating that the location or the computing device the user who is currently utilizing to attempt login is not correct. In response, the executing module 428 may be configured to deny the user who is currently utilizing to attempt login to access the system (i.e., based on detection that the current system does not match the client device 408(1) . . . 408(n)) based on receiving the user's input data. The training module 418 may be configured to further retrain the machine learning model 411 with data associated with denying the user to access the system and marking the system as fraudulent for future data processing purposes.

According to exemplary embodiments, the determining module 430 may be configured to determine, in response to comparing the user credentials data with the biometrics data and the pattern of activity logs data of the user, that the generated score is equal to above the predetermined threshold value. The detecting module 426 may be configured to detect that the user's login attempt is not fraudulent. Accordingly, the executing module 428 may be configured to allow the user to access the system (i.e., access any one of the client devices 408(1) . . . 408(n) included within the system). The training module 418 may be configured to further retrain the machine learning model 411 with data associated with allowing the user to access the system.

According to exemplary embodiments, the score may be a weighted value related to a degree of confidence data that indicates readiness for authorizing login authentication of the user.

Figure 5:
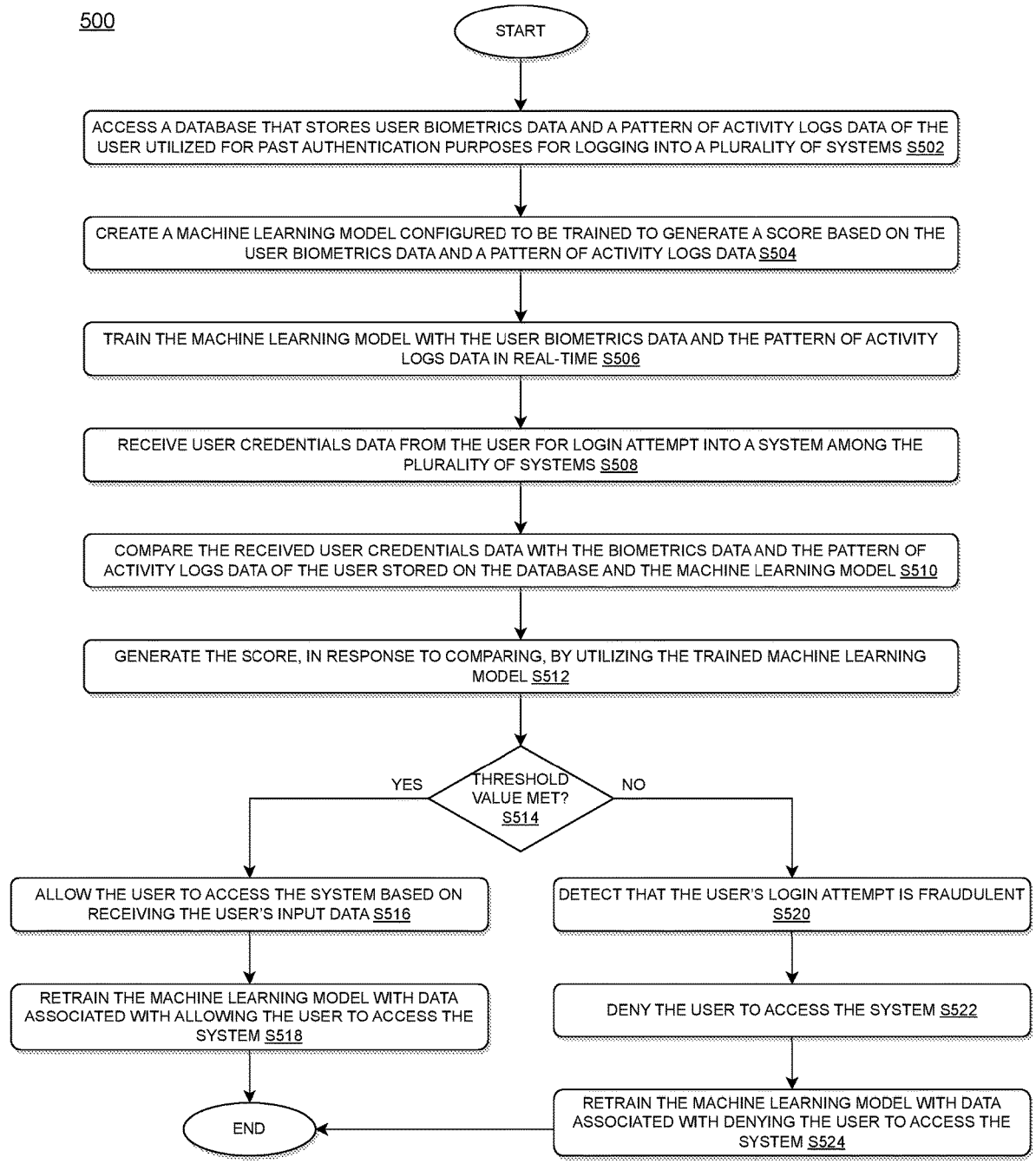
FIG. 5 illustrates a flow chart implemented by the platform and language agnostic machine learning login fraud detection module of FIG. 4 for automatically detecting login fraud based on a machine learning model in real-time in accordance with an exemplary embodiment.

FIG. 5 illustrates a flow chart of a process 500 implemented by the platform and language agnostic MLLFDM 406 of FIG. 4 for automatically detecting login fraud based on a machine learning model in accordance with an exemplary embodiment. It will be appreciated that the illustrated process 500 and associated steps may be performed in a different order, with illustrated steps omitted, with additional steps added, or with a combination of reordered, combined, omitted, or additional steps.

As illustrated in FIG. 5, at step S502, the process 500 may include accessing a database that stores user biometrics data and a pattern of activity logs data of the user utilized for past authentication purposes for logging into a plurality of systems.

At step S504, the process 500 may include creating a machine learning model configured to be trained to generate a score based on the user biometrics data and a pattern of activity logs data.

At step S506, the process 500 may include training the machine learning model with the user biometrics data and the pattern of activity logs data in real-time.

At step S508, the process 500 may include receiving user credentials data from the user for login attempt into a system among the plurality of systems.

At step S510, the process 500 may include comparing the received user credentials data with the biometrics data and the pattern of activity logs data of the user stored on the database and the machine learning model.

At step S512, the process 500 may include generating the score, in response to comparing, by utilizing the trained machine learning model.

At step S514, the process 500 may include determining whether the predetermined threshold value is met or not. For example, when at step S514 it is determined that the threshold value is met (i.e., the generated score is equal to or above a predetermined threshold value), at step S516, the process 500 may include detecting that the user's login attempt is not fraudulent, thereby allowing the user to access the system. And at step S518, the process 500 may include retraining the machine learning model with data associated with allowing the user to access the system. According to exemplary embodiments, the predetermined threshold value may be 70% match with the user's previous activity logs data, but the disclosure is not limited thereto. For example, the predetermined threshold value may include 75%, 80%, 90%, 95% or even 100% match with the user's previous activity logs data.

According to exemplary embodiments, in the process 500, the pattern of activity logs data may include one or more of the following data: data corresponding to the user's frequent use of an automated teller machine, data corresponding to the user's historical online purchase, data corresponding to the user's dining at a specific restaurant, data corresponding to the user's frequent login from a specific geo location outside the user's normal location, and data corresponding to the user's logins on particular dates, weeks, or months, at regular times, but the disclosure is not limited thereto.

According to exemplary embodiments, in the process 500, biometrics data may include one or more of the following data: data corresponding to the user's fingerprints, data corresponding to the user's facial identification, and data corresponding to the user's retinal prints, but the disclosure is not limited thereto.

According to exemplary embodiments, the process 500 may further include: transmitting an electronic notification to a user's computing device associated with the user's previous successful login indicating that a location or a computing device the user is currently utilizing to attempt login does not match with the prestored pattern of actively logs data of the user.

According to exemplary embodiments, the process 500 may further include: receiving user's input data from the user's computing device associated with the user's previous successful login indicating that the location or the computing device the user is currently utilizing to attempt login is actually correct; allowing the user to access the system based on receiving the user's input data; and retraining the machine learning model with data associated with allowing the user to access the system.

According to exemplary embodiments, the process 500 may further include: receiving user's input data from the user's computing device associated with the user's previous successful login indicating that the location or the computing device the user who is currently utilizing to attempt login is not correct; denying the user who is currently utilizing to attempt login to access the system based on receiving the user's input data; and retraining the machine learning model with data associated with denying the user to access the system.

According to exemplary embodiments, in the process 500, the score may be a weighted value related to a degree of confidence data that indicates readiness for authorizing login authentication of the user.

According to exemplary embodiments, the MLLFDD 402 may include a memory (e.g., a memory 106 as illustrated in FIG. 1) which may be a non-transitory computer readable medium that may be configured to store instructions for implementing a MLLFDM 406 for automatically detecting login fraud based on a machine learning model in real-time as disclosed herein. The MLLFDD 402 may also include a medium reader (e.g., a medium reader 112 as illustrated in FIG. 1) which may be configured to read any one or more sets of instructions, e.g., software, from any of the memories described herein. The instructions, when executed by a processor embedded within the MLLFDM 406 or within the MLLFDD 402, may be used to perform one or more of the methods and processes as described herein. In a particular embodiment, the instructions may reside completely, or at least partially, within the memory 106, the medium reader 112, and/or the processor 104 (see FIG. 1) during execution by the MLLFDD 402.

According to exemplary embodiments, the instructions, when executed, may cause a processor 104 embedded within the MLLFDM 406 or the MLLFDD 402 to perform the following: accessing a database that stores user biometrics data and a pattern of activity logs data of the user utilized for past authentication purposes for logging into a plurality of systems; creating a machine learning model configured to be trained to generate a score based on the user biometrics data and a pattern of activity logs data; training the machine learning model with the user biometrics data and the pattern of activity logs data in real-time; receiving user credentials data from the user for login attempt into a system among the plurality of systems; comparing the received user credentials data with the biometrics data and the pattern of activity logs data of the user stored on the database and the machine learning model; and generating the score, in response to comparing, by utilizing the trained machine learning model, wherein the score is a value that is compared with a predetermined threshold value to determine in real-time whether the login attempt is fraudulent.

According to exemplary embodiments, the instructions, when executed, may further cause the processor 104 to perform the following: determining, in response to comparing the user credentials data with the biometrics data and the pattern of activity logs data of the user, that the generated score is below the predetermined threshold value; detecting that the user's login attempt is fraudulent; denying the user to access the system; and retraining the machine learning model with data associated with denying the user to access the system.

According to exemplary embodiments, the instructions, when executed, may further cause the processor 104 to perform the following: transmitting an electronic notification to a user's computing device associated with the user's previous successful login indicating that a location or a computing device the user is currently utilizing to attempt login does not match with the prestored pattern of actively logs data of the user.

According to exemplary embodiments, the instructions, when executed, may further cause the processor 104 to perform the following: receiving user's input data from the user's computing device associated with the user's previous successful login indicating that the location or the computing device the user is currently utilizing to attempt login is actually correct; allowing the user to access the system based on receiving the user's input data; and retraining the machine learning model with data associated with allowing the user to access the system.

According to exemplary embodiments, the instructions, when executed, may further cause the processor 104 to perform the following: receiving user's input data from the user's computing device associated with the user's previous successful login indicating that the location or the computing device the user who is currently utilizing to attempt login is not correct; denying the user who is currently utilizing to attempt login to access the system based on receiving the user's input data; and retraining the machine learning model with data associated with denying the user to access the system.

According to exemplary embodiments, the instructions, when executed, may further cause the processor 104 to perform the following: determining, in response to comparing the user credentials data with the biometrics data and the pattern of activity logs data of the user, that the generated score is equal to or above the predetermined threshold value; and detecting that the user's login attempt is not fraudulent; allowing the user to access the system; and retraining the machine learning model with data associated with allowing the user to access the system.

According to exemplary embodiments as disclosed above in FIGS. 1-5, technical improvements effected by the instant disclosure may include a platform for implementing a platform and language agnostic machine learning login fraud detection module for automatically detecting login fraud based on a machine learning model in real-time that generates a weighted score of login confidence data, but the disclosure is not limited thereto.

For example, according to exemplary embodiments as disclosed above in FIGS. 1-5, technical improvements effected by the instant disclosure may include a platform for implementing a platform and language agnostic machine learning login fraud detection module configured to train the machine learning model with a pattern of activity logs of a user corresponding to past activities data and historical actions data of a user across all channels and applications login; and historical weighted score of the login confidence data associated with the user in real-time, but the disclosure is not limited thereto. Thus, conventional shortcomings of authentication systems can be improved by the implementation of the platform and language agnostic machine learning login fraud detection module as disclosed herein with reference to FIGS. 1-5, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for detecting login fraud based on a machine learning model by utilizing one or more processors along with allocated memory, the method comprising:
   accessing a database that stores user biometrics data and a pattern of activity logs data of the user utilized for past authentication purposes for logging into a plurality of systems;
   creating a machine learning model configured to be trained to generate a score based on the user biometrics data and the pattern of activity logs data;
   training the machine learning model with the user biometrics data and the pattern of activity logs data in real-time;
   receiving user credentials data from the user for login attempt into a system among the plurality of systems;
   comparing the received user credentials data with the biometrics data and the pattern of activity logs data of the user stored on the database and the machine learning model;
   generating the score, in response to comparing, by utilizing the trained machine learning model, wherein the score is a value that is compared with a predetermined threshold value to determine in real-time whether the login attempt is fraudulent or not fraudulent;
   transmitting, in response to detecting that the user's login attempt is fraudulent, an electronic notification to a user's computing device associated with the user's previous successful login indicating that a location or a computing device the user is currently utilizing to attempt login does not match with the prestored pattern of actively logs data of the user;
   receiving user's input data from the user's computing device associated with the user's previous successful login indicating that the location or the computing device the user is currently utilizing to attempt login is actually correct;
   allowing the user to access the system based on receiving the user's input data; and
   retraining the machine learning model with data associated with allowing the user to access the system.

2. The method according to claim 1, wherein the pattern of activity logs data includes one or more of the following data: data corresponding to the user's frequent use of an automated teller machine, data corresponding to the user's historical online purchase, data corresponding to the user's dining at a specific restaurant, data corresponding to the user's frequent login from a specific geo location outside the user's normal location, and data corresponding to the user's logins on particular dates, weeks, or months, at regular times.

3. The method according to claim 1, wherein biometrics data includes one or more of the following data: data corresponding to the user's fingerprints, data corresponding to the user's facial identification, and data corresponding to the user's retinal prints.

4. The method according to claim 1, in detecting that the user's login attempt is fraudulent, the method further comprising:
determining, in response to comparing the user credentials data with the biometrics data and the pattern of activity logs data of the user, that the generated score is below the predetermined threshold value.

5. The method according to claim 1, further comprising:
determining, in response to comparing the user credentials data with the biometrics data and the pattern of activity logs data of the user, that the generated score is equal to or above the predetermined threshold value; and
detecting that the user's login attempt is not fraudulent;
allowing the user to access the system; and
retraining the machine learning model with data associated with allowing the user to access the system.

6. The method according to claim 4, wherein the score is a weighted value related to a degree of confidence data that indicates readiness for authorizing login authentication of the user.

7. A system for implementing for detecting login fraud based on a machine learning model, the system comprising:
a processor; and
a memory operatively connected to the processor via a communication interface, the memory storing computer readable instructions, when executed, causes the processor to:
access a database that stores user biometrics data and a pattern of activity logs data of the user utilized for past authentication purposes for logging into a plurality of systems;
create a machine learning model configured to be trained to generate a score based on the user biometrics data and the pattern of activity logs data;
train the machine learning model with the user biometrics data and the pattern of activity logs data in real-time;
receive user credentials data from the user for login attempt into a system among the plurality of systems;
compare the received user credentials data with the biometrics data and the pattern of activity logs data of the user stored on the database and the machine learning model; and
generate the score, in response to comparing, by utilizing the trained machine learning model, wherein the score is a value that is compared with a predetermined threshold value to determine in real-time whether the login attempt is fraudulent or not fraudulent;
transmit, in response to detecting that the user's login attempt is fraudulent, an electronic notification to a user's computing device associated with the user's previous successful login indicating that a location or a computing device the user is currently utilizing to attempt login does not match with the prestored pattern of actively logs data of the user;
receive user's input data from the user's computing device associated with the user's previous successful login indicating that the location or the computing device the user is currently utilizing to attempt login is actually correct;
allow the user to access the system based on receiving the user's input data; and
retrain the machine learning model with data associated with allowing the user to access the system.

8. The system according to claim 7, wherein the pattern of activity logs data includes one or more of the following data: data corresponding to the user's frequent use of an automated teller machine, data corresponding to the user's historical online purchase, data corresponding to the user's dining at a specific restaurant, data corresponding to the user's frequent login from a specific geo location outside the user's normal location, and data corresponding to the user's logins on particular dates, weeks, or months, at regular times.

9. The system according to claim 7, wherein biometrics data includes one or more of the following data: data corresponding to the user's fingerprints, data corresponding to the user's facial identification, and data corresponding to the user's retinal prints.

10. The system according to claim 7, wherein, in detecting that the user's login attempt is fraudulent, the processor is further configured to:
determine, in response to comparing the user credentials data with the biometrics data and the pattern of activity logs data of the user, that the generated score is below the predetermined threshold value.

11. The system according to claim 7, wherein the processor is further configured to:
determine, in response to comparing the user credentials data with the biometrics data and the pattern of activity logs data of the user, that the generated score is equal to or above the predetermined threshold value; and
detect that the user's login attempt is not fraudulent;
allow the user to access the system; and
retrain the machine learning model with data associated with allowing the user to access the system.

12. The system according to claim 10, wherein the score is a weighted value related to a degree of confidence data that indicates readiness for authorizing login authentication of the user.

13. A non-transitory computer readable medium configured to store instructions for detecting login fraud based on a machine learning model, the instructions, when executed, cause a processor to perform the following:
accessing a database that stores user biometrics data and a pattern of activity logs data of the user utilized for past authentication purposes for logging into a plurality of systems;
creating a machine learning model configured to be trained to generate a score based on the user biometrics data and the pattern of activity logs data;
training the machine learning model with the user biometrics data and the pattern of activity logs data in real-time;
receiving user credentials data from the user for login attempt into a system among the plurality of systems;
comparing the received user credentials data with the biometrics data and the pattern of activity logs data of the user stored on the database and the machine learning model; and
generating the score, in response to comparing, by utilizing the trained machine learning model, wherein the score is a value that is compared with a predetermined threshold value to determine in real-time whether the login attempt is fraudulent or not fraudulent;

transmitting, in response to detecting that the user's login attempt is fraudulent, an electronic notification to a user's computing device associated with the user's previous successful login indicating that a location or a computing device the user is currently utilizing to attempt login does not match with the prestored pattern of actively logs data of the user;

receiving user's input data from the user's computing device associated with the user's previous successful login indicating that the location or the computing device the user is currently utilizing to attempt login is actually correct;

allowing the user to access the system based on receiving the user's input data; and retraining the machine learning model with data associated with allowing the user to access the system.

14. The non-transitory computer readable medium according to claim 13, wherein, in detecting that the user's login attempt is fraudulent, the instructions, when executed, cause the processor to further perform the following:

determining, in response to comparing the user credentials data with the biometrics data and the pattern of activity logs data of the user, that the generated score is below the predetermined threshold value.

15. The system according to claim 14, wherein the score is a weighted value related to a degree of confidence data that indicates readiness for authorizing login authentication of the user.

16. The non-transitory computer readable medium according to claim 13, wherein the pattern of activity logs data includes one or more of the following data: data corresponding to the user's frequent use of an automated teller machine, data corresponding to the user's historical online purchase, data corresponding to the user's dining at a specific restaurant, data corresponding to the user's frequent login from a specific geo location outside the user's normal location, and data corresponding to the user's logins on particular dates, weeks, or months, at regular times.

17. The non-transitory computer readable medium according to claim 13, wherein the biometrics data includes one or more of the following data: data corresponding to the user's fingerprints, data corresponding to the user's facial identification, and data corresponding to the user's retinal prints.

18. The non-transitory computer readable medium according to claim 13, wherein the instructions, when executed, cause the processor to further perform the following:

determining, in response to comparing the user credentials data with the biometrics data and the pattern of activity logs data of the user, that the generated score is equal to or above the predetermined threshold value; and detecting that the user's login attempt is not fraudulent;

allowing the user to access the system; and retraining the machine learning model with data associated with allowing the user to access the system.

19. A method for detecting login fraud based on a machine learning model by utilizing one or more processors along with allocated memory, the method comprising:

accessing a database that stores user biometrics data and a pattern of activity logs data of the user utilized for past authentication purposes for logging into a plurality of systems;

creating a machine learning model configured to be trained to generate a score based on the user biometrics data and the pattern of activity logs data;

training the machine learning model with the user biometrics data and the pattern of activity logs data in real-time;

receiving user credentials data from the user for login attempt into a system among the plurality of systems;

comparing the received user credentials data with the biometrics data and the pattern of activity logs data of the user stored on the database and the machine learning model;

generating the score, in response to comparing, by utilizing the trained machine learning model, wherein the score is a value that is compared with a predetermined threshold value to determine in real-time whether the login attempt is fraudulent;

determining, in response to comparing the user credentials data with the biometrics data and the pattern of activity logs data of the user, that the generated score is below the predetermined threshold value;

detecting that the user's login attempt is fraudulent;

transmitting, in response to detecting that the user's login attempt is fraudulent, an electronic notification to a user's computing device associated with the user's previous successful login indicating that a location or a computing device the user is currently utilizing to attempt login does not match with the prestored pattern of actively logs data of the user;

receiving user's input data from the user's computing device associated with the user's previous successful login indicating that the location or the computing device the user who is currently utilizing to attempt login is not correct;

denying the user who is currently utilizing to attempt login to access the system based on receiving the user's input data; and retraining the machine learning model with data associated with denying the user to access the system.

* * * * *